(12) United States Patent
Ros

(10) Patent No.: US 10,994,227 B2
(45) Date of Patent: May 4, 2021

(54) DEWATERING BOX

(71) Applicant: United Rentals, Inc., Stamford, CT (US)

(72) Inventor: E. B. (Bart) Ros, Deventer (NL)

(73) Assignee: UNITED RENTALS, INC., Stamford, CT (US)

(*) Notice: Subject to any disclaimer, the term of this patent is extended or adjusted under 35 U.S.C. 154(b) by 0 days.

(21) Appl. No.: 16/522,070

(22) Filed: Jul. 25, 2019

(65) Prior Publication Data
US 2020/0030721 A1 Jan. 30, 2020

Related U.S. Application Data

(60) Provisional application No. 62/703,345, filed on Jul. 25, 2018.

(51) Int. Cl.
C02F 11/12 (2019.01)
B01D 21/00 (2006.01)
B01D 21/02 (2006.01)
C02F 11/121 (2019.01)
C02F 1/00 (2006.01)
B01D 29/01 (2006.01)
B01D 29/52 (2006.01)

(52) U.S. Cl.
CPC ..... B01D 21/0012 (2013.01); B01D 21/0006 (2013.01); B01D 21/10 (2013.01); B01D 29/01 (2013.01); B01D 29/52 (2013.01); C02F 1/004 (2013.01); C02F 11/121 (2013.01); C02F 2001/007 (2013.01); C02F 2201/002 (2013.01)

(58) Field of Classification Search
CPC ............ B01D 21/0006; B01D 21/0012; B01D 21/2405; B01D 29/05; B01D 29/52; B01D 29/90; C02F 11/121
USPC ................................ 210/804, 299, 455, 484
See application file for complete search history.

(56) References Cited

U.S. PATENT DOCUMENTS 1,311,639 A * 7/1919 Cartwright ................ C02F 1/78
   210/464
2,996,189 A * 8/1961 Salterbach ............. B01D 29/05
   210/236

(Continued)

OTHER PUBLICATIONS

International Search Report and Written Opinion in PCT/US2019/043426, dated Oct. 2019.

Primary Examiner — Christopher Upton
(74) Attorney, Agent, or Firm — K&L Gates LLP

(57) ABSTRACT

A sludge dewatering tank that includes a first wall, a second wall, a third wall, a fourth wall and a bottom that cooperate to define a tank interior, a first interior wall and a second interior wall. The first interior wall cooperates with the first wall to define a first drainage compartment and includes at least a first filter member. The first drainage compartment includes at least a first drain that communicates the first drainage compartment with an exterior of the sludge dewatering tank. The second interior wall cooperates with the second wall to define a second drainage compartment and includes at least a second filter member. The second drainage compartment includes at least a second drain that communicates the second drainage compartment with the exterior of the sludge dewatering tank. The first interior wall cooperates with the second interior wall to define a sludge space therebetween.

3 Claims, 7 Drawing Sheets

(56) References Cited

U.S. PATENT DOCUMENTS

| | | | | |
|---|---|---|---|---|
| 3,814,261 A | * | 6/1974 | Morgan, Jr. | B01D 29/90 |
| | | | | 210/484 |
| 4,517,082 A | * | 5/1985 | Prudhomme | B01D 29/05 |
| | | | | 210/443 |
| 4,871,454 A | * | 10/1989 | Lott | B01D 29/23 |
| | | | | 210/455 |
| 4,929,353 A | * | 5/1990 | Harris | B01D 29/05 |
| | | | | 210/473 |
| 5,589,081 A | | 12/1996 | Harris | |
| 5,595,654 A | | 1/1997 | Caughman, Jr. | |
| 5,681,460 A | * | 10/1997 | Caughman, Jr. | B01D 29/96 |
| | | | | 210/486 |
| 6,146,528 A | | 11/2000 | Caughman, Jr. | |
| 6,258,268 B1 | * | 7/2001 | Lake | B01D 29/35 |
| | | | | 210/484 |
| 6,616,834 B2 | * | 9/2003 | Anderson | B01D 21/0012 |
| | | | | 210/299 |
| 7,410,576 B2 | * | 8/2008 | Brouillard | B01D 29/23 |
| | | | | 210/455 |
| 2008/0169236 A1 | | 7/2008 | Caughman | |

* cited by examiner

DEWATERING BOX

CROSS REFERENCE TO RELATED APPLICATIONS

This application claims the benefit of U.S. Provisional Application No. 62/703,345, filed Jul. 25, 2018, the entirety of which is incorporated herein by reference.

FIELD OF THE INVENTION

The present invention relates generally to dewatering sludge, and more particularly to a box or tank for dewatering sludge that includes multiple entry points.

BACKGROUND OF THE INVENTION

Systems exist for removing solids from wastewater streams. However, the resulting sludge still has water therein. Users often want to reduce costs for disposing of the sludge or waste by removing as much as water as possible therefrom. The present invention is a dewatering box for removing water from sludge or the like.

SUMMARY OF THE INVENTION

In accordance with a first aspect of the present invention there is provided a sludge dewatering tank that includes a first wall, a second wall, a third wall, a fourth wall and a bottom that cooperate to define a tank interior, a first interior wall and a second interior wall. The first interior wall cooperates with the first wall to define a first drainage compartment and includes at least a first filter member. The first drainage compartment includes at least a first drain that communicates the first drainage compartment with an exterior of the sludge dewatering tank. The second interior wall cooperates with the second wall to define a second drainage compartment and includes at least a second filter member. The second drainage compartment includes at least a second drain that communicates the second drainage compartment with the exterior of the sludge dewatering tank. The first interior wall cooperates with the second interior wall to define a sludge space therebetween. In a preferred embodiment, the sludge dewatering tank includes first and second cover members. The first cover member is movable between an open position and a closed position. In the closed position the first cover member at least partially defines the first drainage compartment and covers an upper surface of the first filter member. The first filter member is movable between a filter position and a removed position. When the first cover member is in the open position the first filter member can be moved to the removed position. The second cover member is movable between an open position and a closed position. In the closed position the second cover member at least partially defines the second drainage compartment and covers an upper surface of the second filter member. The second filter member is movable between a filter position and a removed position. When the second cover member is in the open position the second filter member can be moved to the removed position. In a preferred embodiment, the first and second cover members are pivotable between the opened and closed positions. In a preferred embodiment, the first wall includes a dumping channel defined therein.

In a preferred embodiment, at least one of the first, second, third or fourth walls includes a first hose fixing member on an upper edge thereof and at least one of the first, second, third or fourth walls includes a sludge inlet defined therein. In an embodiment, the first filter can include a first screen coupled thereto. In this embodiment, the first filter member is capable of filtering particles down to a first particle size, the first screen is capable of filtering particles down to a second particle size, and the second particle size is smaller than the first particle size.

In a preferred embodiment, the first drainage compartment includes at least a third drain that communicates the first drainage compartment with the exterior of the sludge dewatering tank, the first and third drawings are position at opposite ends of the first drainage compartment, the second drainage compartment includes at least a fourth drain that communicates the second drainage compartment with an exterior of the sludge dewatering tank, and the second and fourth drains are position at opposite ends of the first drainage compartment. Preferably, the first filter member is positioned in a first slot and the second filter member is positioned in a second slot. The first slot is defined by first and second post members that are part of the first interior wall and the second slot is defined by third and fourth post members that are part of the second interior wall. The first and second posts each include a slot member that receives an outer surface of the first filter member and the third and fourth posts each include a slot member that receives an outer surface of the second filter member.

In accordance with another aspect of the present invention there is provided a method of dewatering sludge that includes inserting sludge with water therein into a sludge space in a dewatering tank. The insertion of the sludge can be done through one or more of a dumping channel defined in one of a first, second, third or fourth wall thereof, a first hose fixing member disposed on one of the first, second, third or fourth walls, or a sludge inlet defined in one of the first, second, third or fourth walls. The sludge space is defined between a first interior wall and a second interior wall. The method also includes allowing the sludge to settle. During this step a first portion of water flows through a first filter member in the first interior wall and into a first drainage compartment defined between the first wall and the first interior wall and a second portion of water flows through a second filter member in the second interior wall and into a second drainage compartment defined between the second wall and the second interior wall.

In a preferred embodiment, the method also includes moving a first cover member from a closed position to an open position, removing the first filter member from a first slot, inserting a third filter member into the third slot, and moving the first cover member from the open position to the closed position. The method can also include moving a first cover member from a closed position to an open position, removing the first filter member from a first slot, coupling a first screen to the first filter member, placing the first filter member and first screen into the slot, and moving the first cover member from the open position to the closed position.

The present invention is a dewatering box for removing water from sludge or the like. In use, the sludge can be disposed into the box in a number of different ways. It can be inserted by a machine such as an excavator or truck by dropping the sludge from the top opening of the dewatering box. There also is at least one flange connection on the backside where a hose or piping can be connected so sludge can be disposed therein (e.g., from a vacuum truck). Or, a user can put a hose or hoses over the edge of the box and insert the sludge therein. Furthermore, a truck can back up to the box and directly empty the contents into the box at least partially through a side slot.

After dumping or pumping the sludge into the box, in a preferred embodiment, there are filters and/or screens on both sides of the box interior. The filters are permeable and the permeability can change from application to application (e.g., 390 microns). In use, after the sludge is inserted into the box, the water starts rising and floating and, as a result, flow through the filters and into compartments on the sides of the box. The solids start settling to the bottom of the box as the water flows through the permeable side screens. There are preferably draining points at all four corners of the box (in the side compartments) so water can be drained out of the box.

In a preferred embodiment, the filters can include a sleeve, screen or the like that includes an additional textile which makes the perforation or permeability smaller. Therefore, when even smaller particles are included the sleeves can be placed over the removable filter panels to filter the smaller particles. In a preferred embodiment each side of the box includes three removable filters. However, this is not a limitation and anywhere from 1 to 100 or more removable screens can be used.

The user can adjust the different filtration grades. Also, for cleaning the system, the removable filters can be taken out and cleaned. Therefore, it is believed that the ability to adjust the different filtration rates (screen or sleeve sizes) together with multiple options for filling in the tank and removable filters for ease of cleaning is different than the prior art. Furthermore, the present invention can be used to dewater and transport dangerous waste.

Furthermore, the tank assembly can be used with the lamella filter tank assembly taught in U.S. Patent App. No. 62/703,337, filed simultaneously herewith, the entirety of which is incorporated herein by reference. The sludge placed in the dewatering tank assembly can be the sludge removed from the bottom of the compartments in the lamella filter tank assembly.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
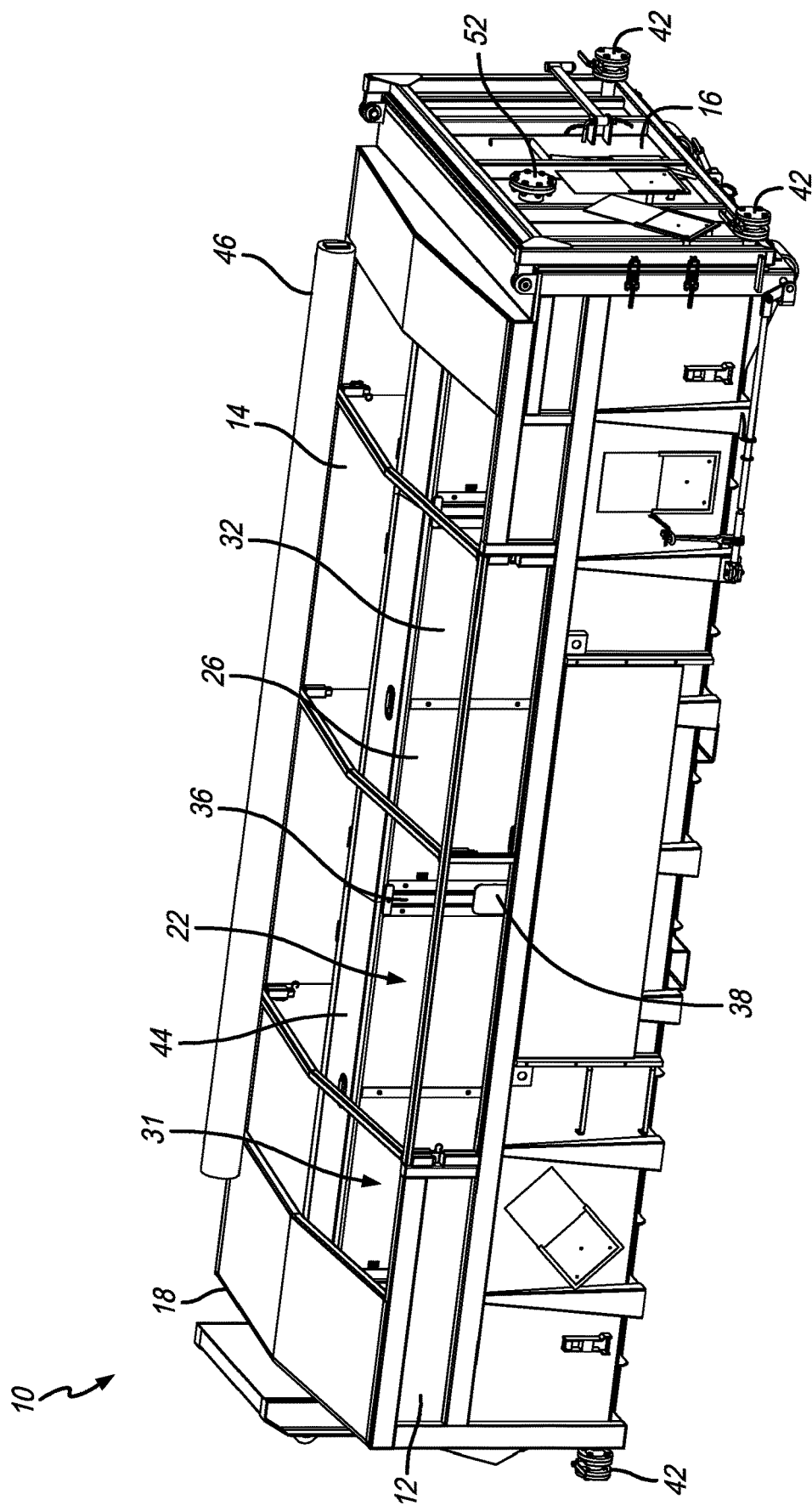
FIG. 1 is a perspective view of a sludge dewatering tank in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, FIGS. 1-7 show a dewatering tank 10 that can be used to separate or remove water from sludge.

Generally, as shown in FIG. 1, the dewatering tank 10 includes a first wall 12, a second wall 14, a third wall 16, a fourth wall 18 and a bottom 20 that cooperate to define a tank interior 22. A first interior wall 24 cooperates with the first wall 12 to define a first drainage compartment 26 and a second interior wall 28 cooperates with the second wall 14 to define a second drainage compartment 30. The first interior wall 24 cooperates with the second interior wall 28 to define a sludge space 31 therebetween.

Figure 6:
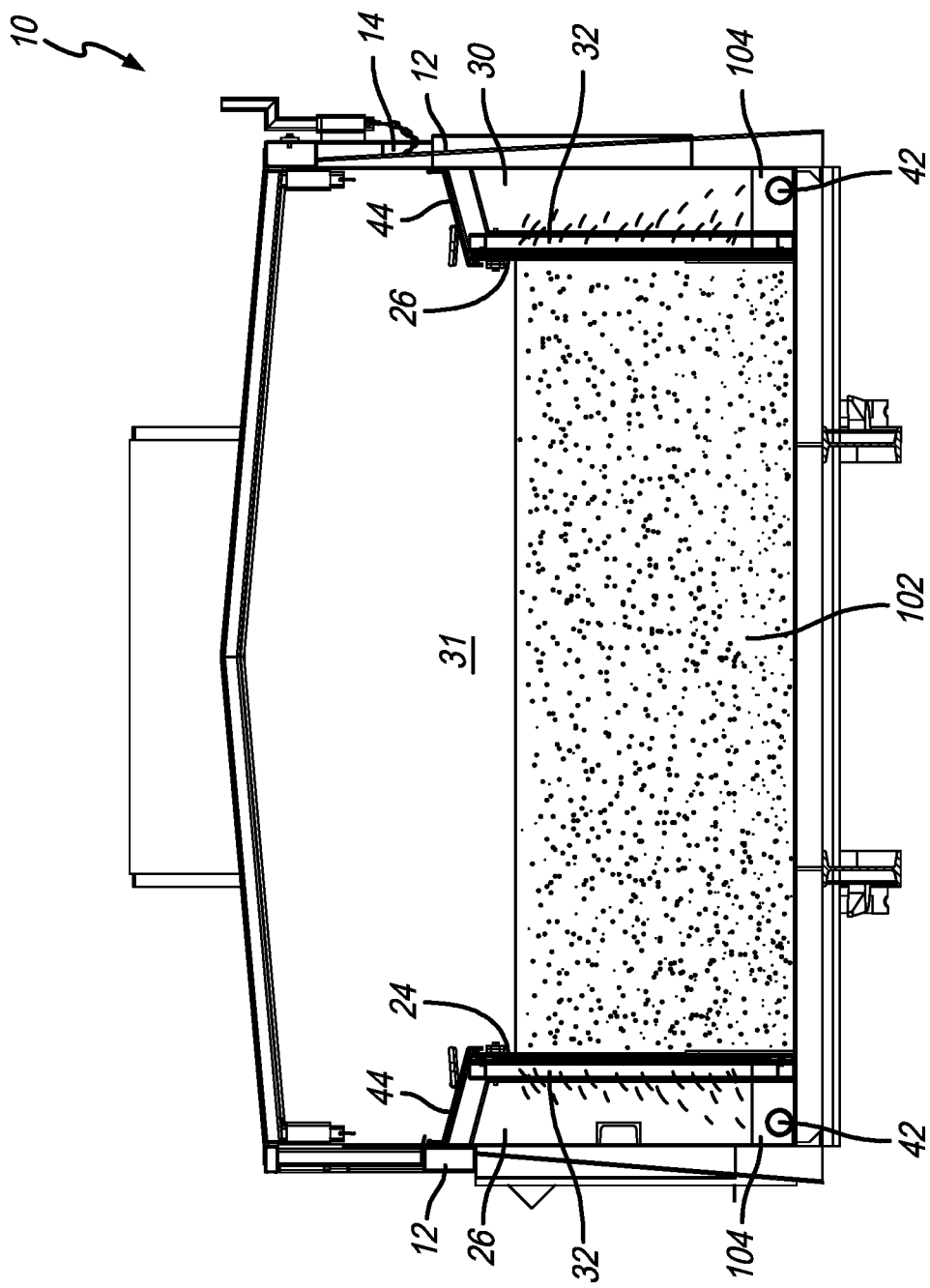
FIG. 6 is a cross-sectional elevational view of the dewatering tank with sludge therein and water flowing into the drainage compartments.
Figure 7:
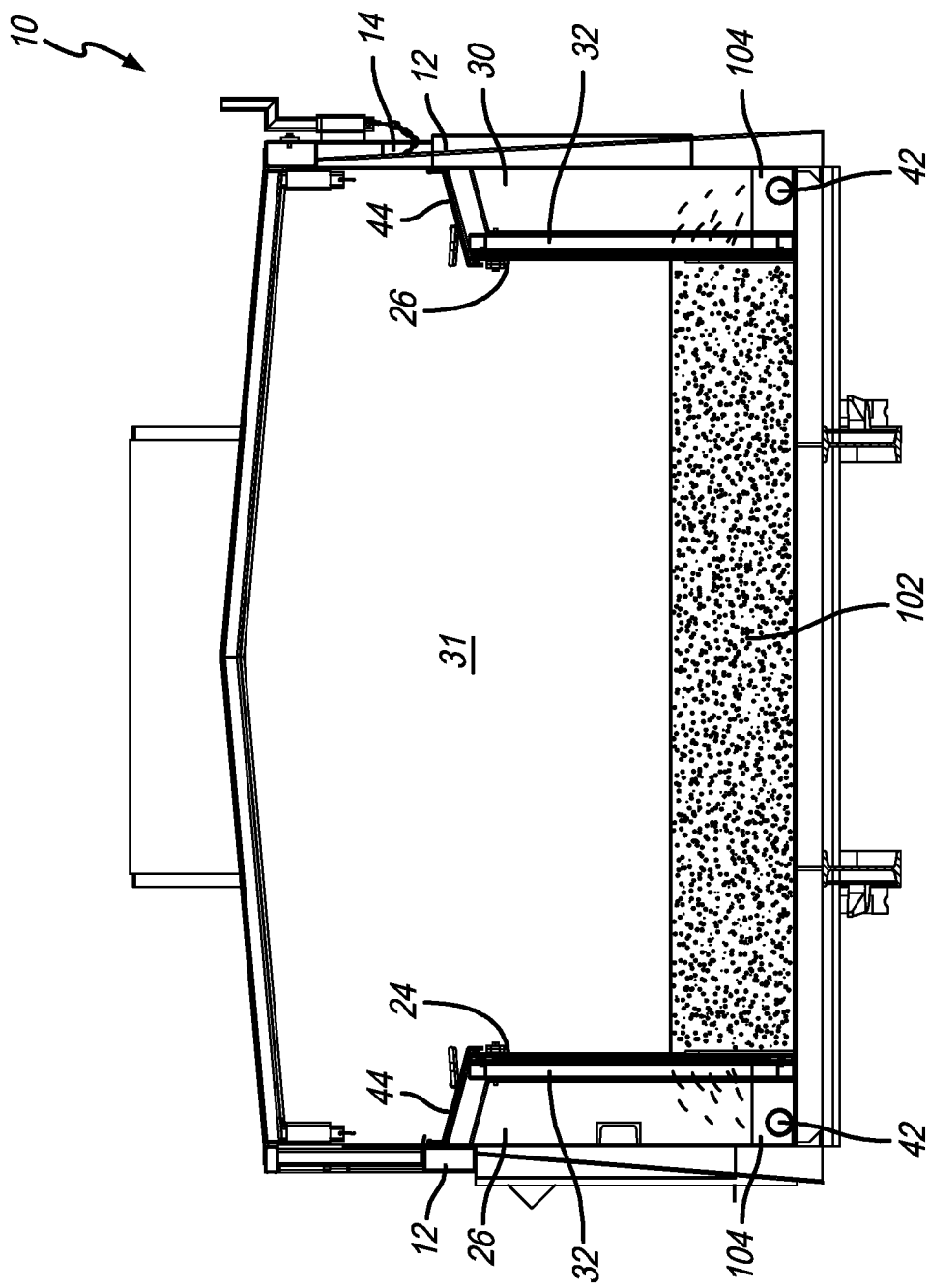
FIG. 7 is a cross-sectional elevational view of the dewatering tank with the sludge having been further dewatered from FIG. 6.

The first and second interior walls 24 and 28 are capable of filtering particles and allowing water to flow therethrough and into the first and second drainage compartments 26 and 30 (see FIGS. 6 and 7). Accordingly, the both the first and second interior walls 24 and 28 include or are made up of at least one and preferably a plurality of filter members 32. In a preferred embodiment, the filter members 32 are removable. Therefore, the first and second interior walls 24 and 28 include slots 34 that receive the filter members 32. Preferably, the slots 34 are defined by posts 36 that include slot members 38 thereon. The slot members 38 can include two flanges 40 that define a space therebetween that receives the outer edge or surface of the filter member 32.

Figure 2:
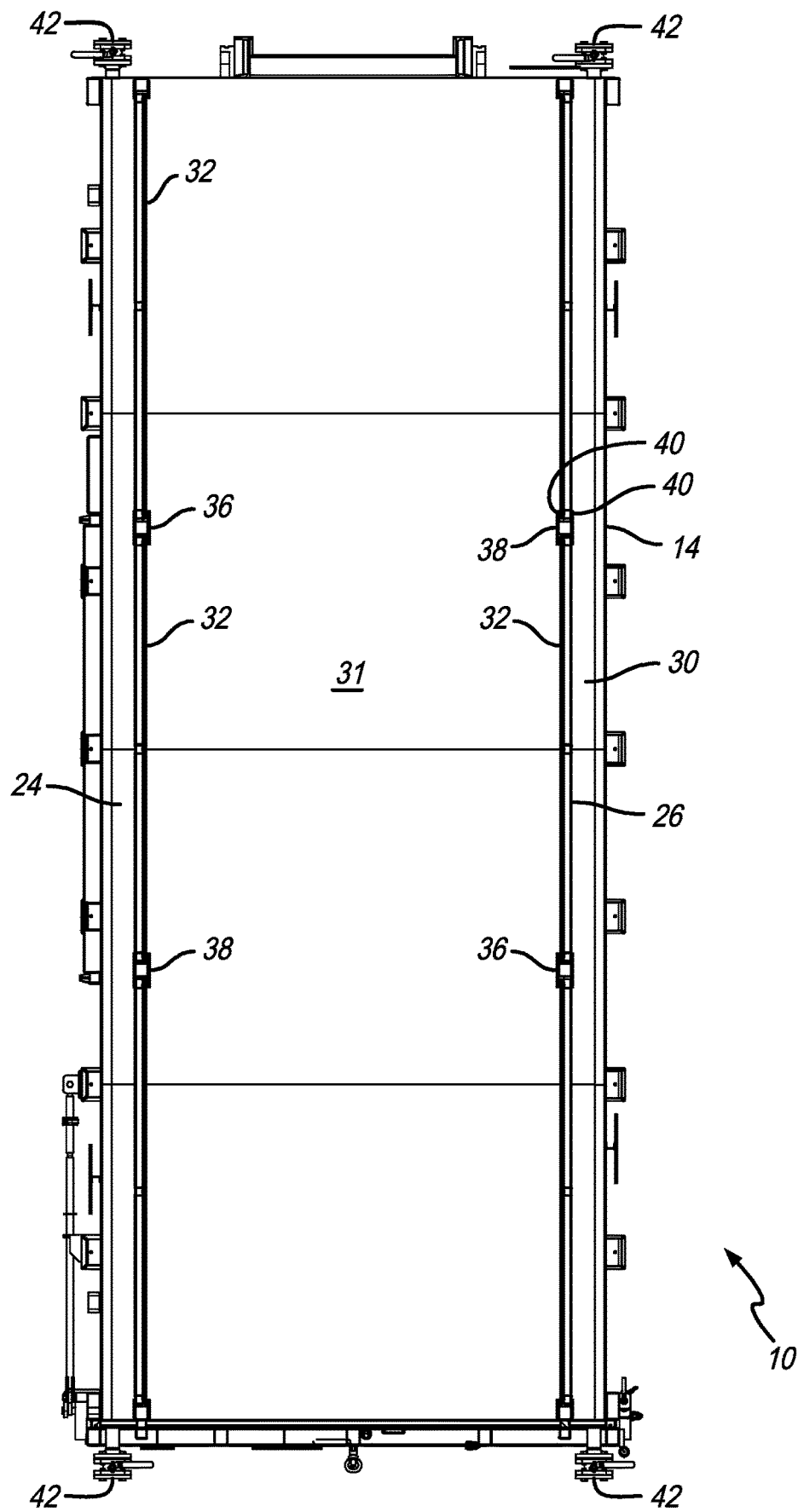
FIG. 2 is a cross-sectional top plan view of the dewatering tank.

As shown in FIG. 2, in a preferred embodiment, the first and second drainage compartments 26 and 30 each include at least one and preferably two or more drains 42 through which the water that enters the drainage compartments can be drained. In a preferred embodiment, the drains 42 are located at the opposite ends of the drainage compartments.

Figure 3:
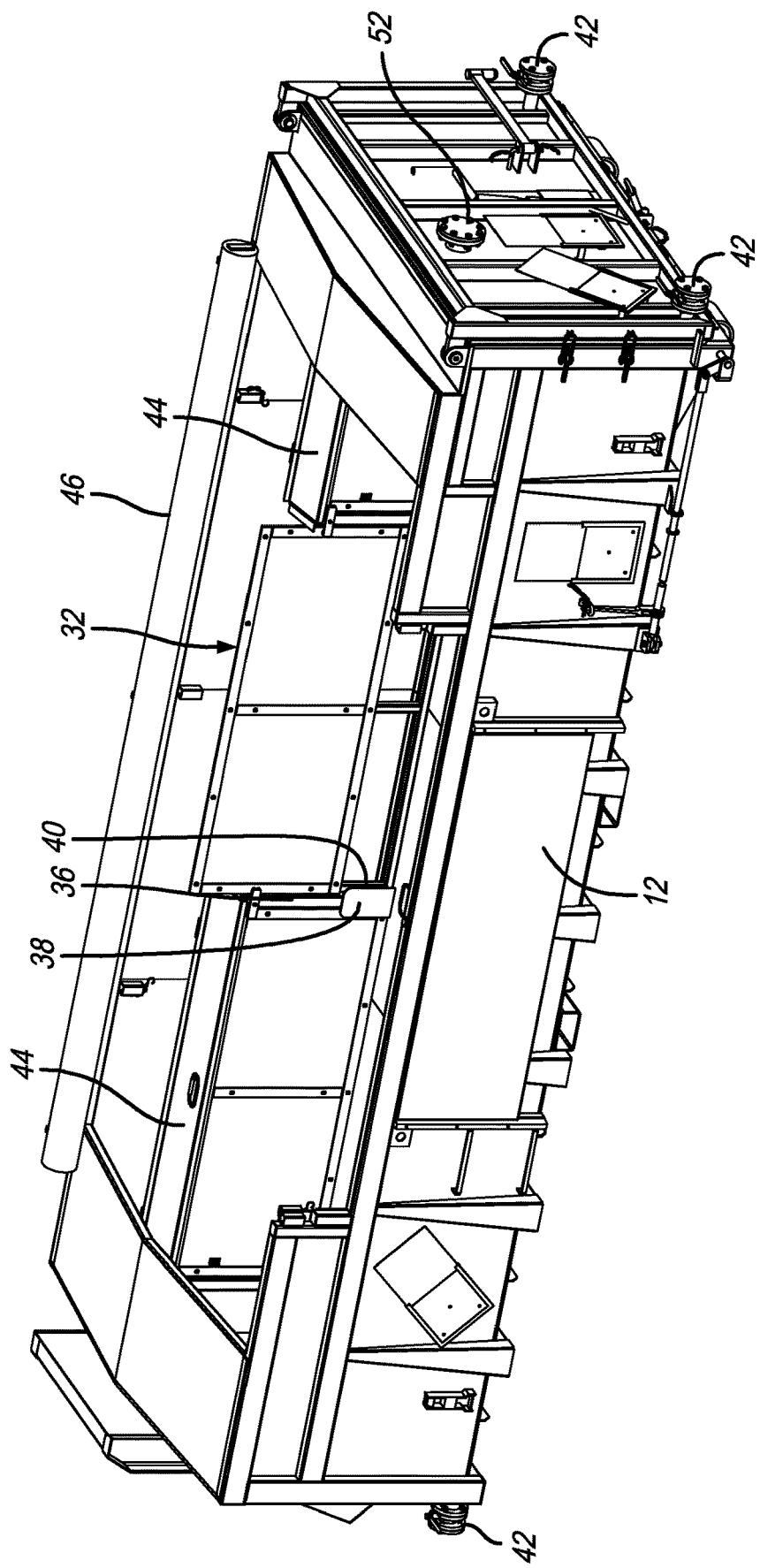
FIG. 3 is a perspective view of the dewatering tank with one of the cover members opened and a filter member removed.

As shown in FIG. 3, in a preferred embodiment, the dewatering tank 10 includes cover members 44 that cover the first and second drainage compartments 26 and 30 and also cover the upper surfaces of the filter members 32. The cover members 44 are preferably pivotable or otherwise movable (or removable) between an open position and a closed position. In the closed position each cover member 44 at least partially defines the drainage compartment and covers the upper surface of the filter member(s) 32 there beneath. When the cover member 44 is pivoted to the open position, the filter members 32 can be removed from their slot 34. Also, the opening of the cover members 44 allows cleaning of the drainage compartments.

It will be appreciated by those of ordinary skill in the art that the dewatering tank 10 includes multiple ways of or capabilities for filling the sludge space 31 with sludge. Preferably, the dewatering tank 10 has an open top through which sludge can be inserted into the sludge space 31. The tank 10 can include a cover, such as a tarp 46 or the like (see the rolled tarp 46 in FIG. 1) that covers and closes the tank when not in use.

Figure 4:
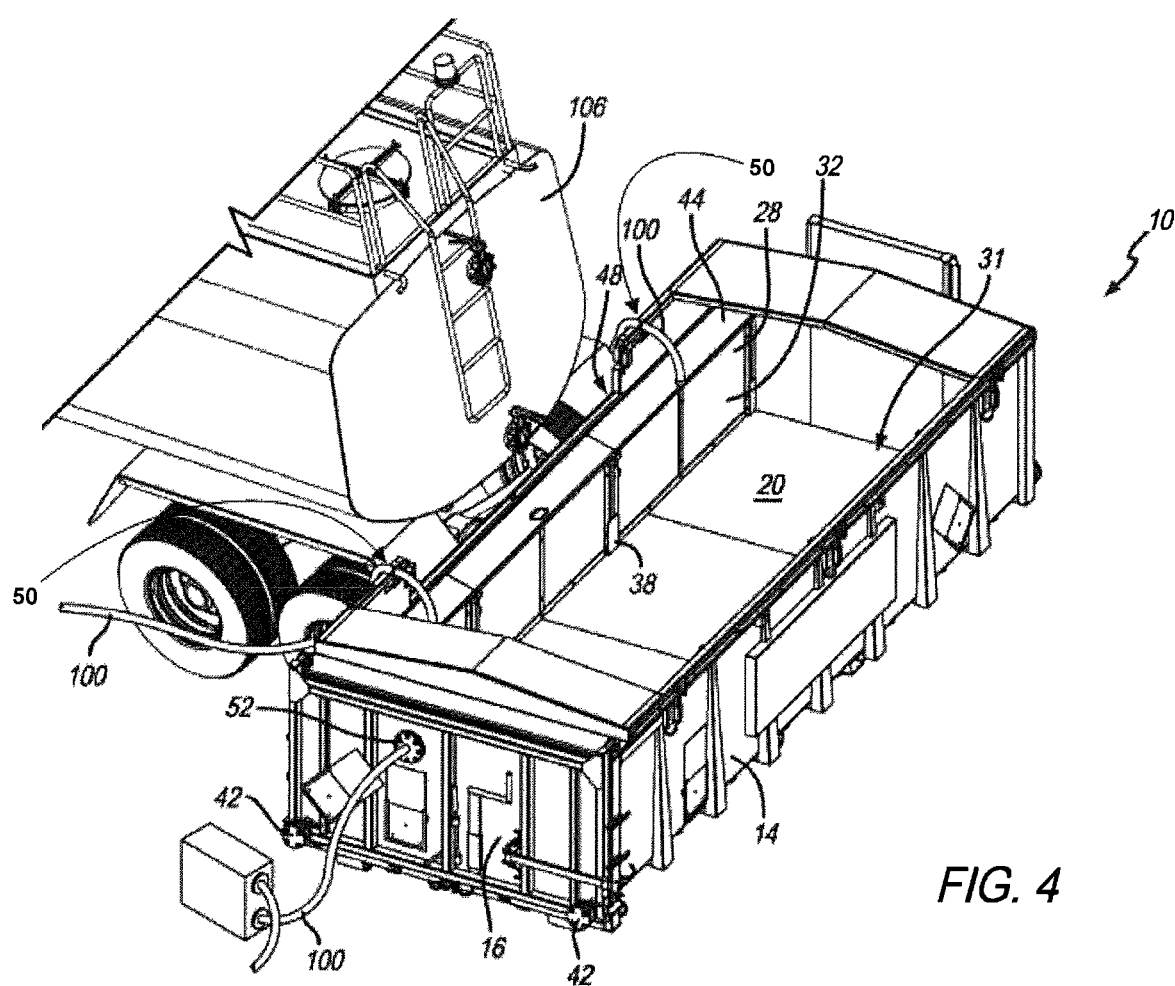
FIG. 4 is a perspective view of the dewatering tank showing multiple connection points for sludge entry.

As shown in FIG. 4, in a preferred embodiment, the first wall 12 includes a dumping channel defined 48 therein. The dumping channel 48 is open to the top of the tank and includes a lower upper edge 48a than the remainder of the first wall 12. As shown in FIG. 3, the dumping channel 48 allows a truck or the like to back up and dump sludge through the dumping channel 48 and the open top of the dewatering tank 10.

In a preferred embodiment, the dewatering tank 10 also includes one or more hose clamps or fixing members 50 for securing hoses 100 (e.g., a non-flanged hose) to the tank 10 so sludge can be pumped through the hose 100 and into the sludge space 31. The fixing members 50 can be secured to any of the walls. As shown in FIG. 4, in a preferred embodiment, two fixing members 50 are secured to the first wall 12 on opposite sides of the dumping channel 48. The fixing members 50 in this embodiment are clamps that secure a hose between the clamp and the upper edge of the first wall 12.

As shown in FIG. 4, preferably, the tank also includes at least one sludge inlet 52 defined in one of the walls (the third wall 16 in FIG. 4) to which a flanged hose 100 can be connected. More than one sludge inlet is within the scope of the present invention.

Figure 5:
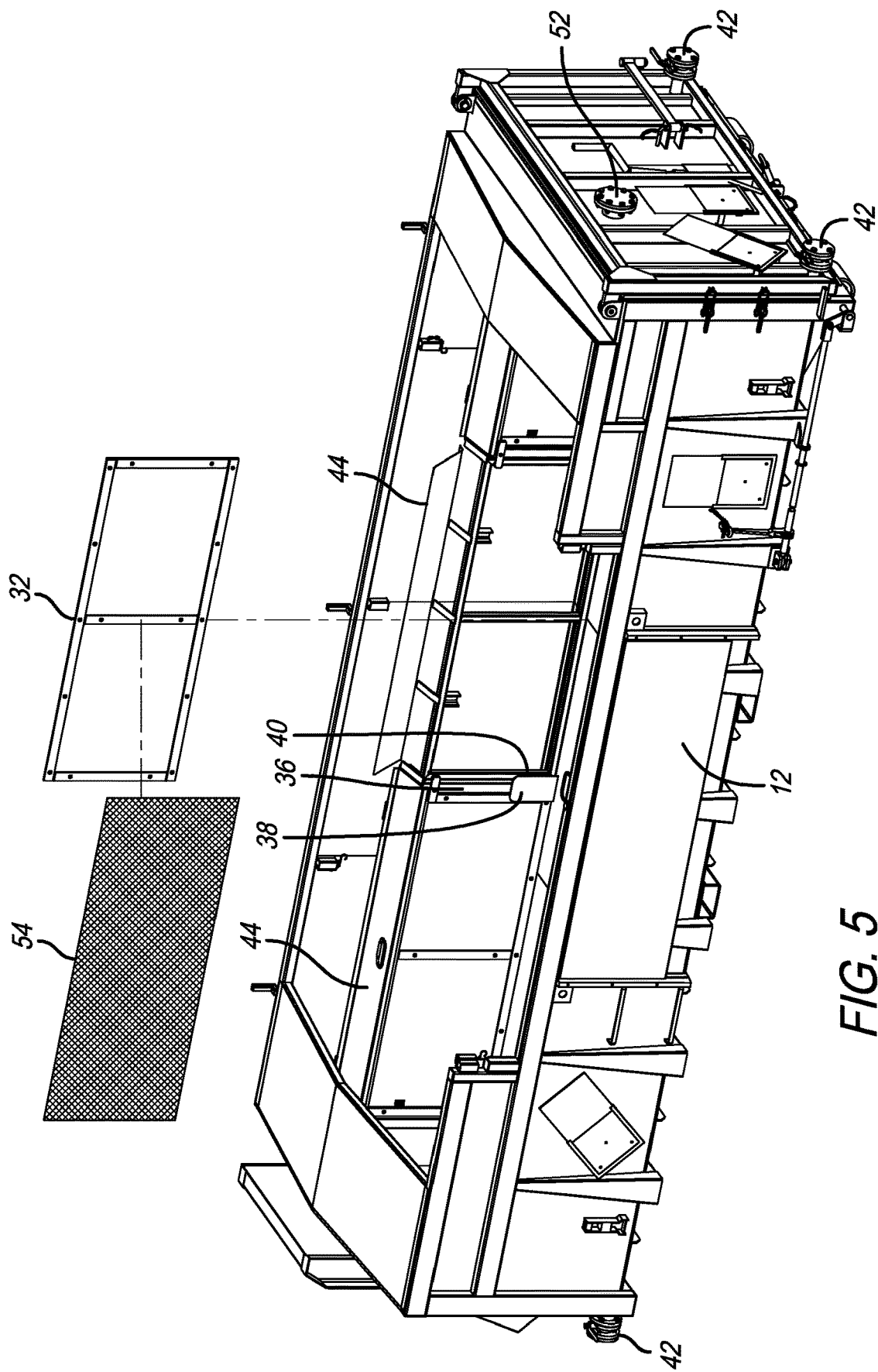
FIG. 5 is a perspective view of the dewatering tank with one of the cover members opened and a screen and filter member removed.

As shown in FIG. 5, in a preferred embodiment, screens 54 can be used to change the particle size filtration capability of the dewatering tank 10. The filter members 32 are capable of filtering particles down to a first particle size (e.g., particles down to 390 microns). In a situation where the subject sludge includes smaller particles a screen 54 can be coupled with each filter member 32 so that particles down to a second particle size (e.g., 100 micron screen or 200 micron screen) can be filtered. The screen 54 can be a sleeve that fits around the filter member 32 or an overlay that is secured against or otherwise attached to the front or back surface of the filter member 32.

FIGS. 6-7 show an exemplary use of the dewatering tank 10. As shown in FIG. 6, after sludge 102 mixed with water 104 is inserted into the sludge space 31, the solids particles within the sludge begin to settle to the bottom because they are kept in the sludge space 31 by the first and second interior walls 24 and 28 and the filter members 32. As shown in FIG. 7, as the sludge 102 compresses by gravity, water 104 moves above the sledge and/or is pressed out, moves through the filter members 32 and into the first and second drainage compartments 26 and 30. The water 104 then drains out of the drainage compartments through one or more of the drains. The sludge can then be disposed of.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only examplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A sludge dewatering tank that comprises:
   a first wall, a second wall, a third wall, a fourth wall and a bottom that cooperate to define a tank interior,
   a first interior wall that cooperates with the first wall to define a first drainage compartment, wherein the first interior wall includes at least a first filter member, and wherein the first drainage compartment includes at least a first drain that communicates the first drainage compartment with an exterior of the sludge dewatering tank,
   a second interior wall that cooperates with the second wall to define a second drainage compartment, wherein the second interior wall includes at least a second filter member, and wherein the second drainage compartment includes at least a second drain that communicates the second drainage compartment with the exterior of the sludge dewatering tank,
   wherein the first interior wall cooperates with the second interior wall to define a sludge space therebetween, and wherein the first drainage compartment includes at least a third drain that communicates the first drainage compartment with the exterior of the sludge dewatering tank, wherein the first and third drains are positioned at opposite ends of the first drainage compartment, wherein the second drainage compartment includes at least a fourth drain that communicates the second drainage compartment with an exterior of the sludge dewatering tank, and wherein the second and fourth drains are positioned at opposite ends of the first drainage compartment.

2. A sludge dewatering tank that comprises:
   a first wall, a second wall, a third wall, a fourth wall and a bottom that cooperate to define a tank interior, wherein the first wall includes a dumping channel defined therein, wherein at least one of the first, second, third or fourth walls includes a first hose fixing member on an upper edge thereof, and wherein at least one of the first, second, third or fourth walls includes a sludge inlet defined therein,
   a first interior wall that cooperates with the first wall to define a first drainage compartment, wherein the first interior wall includes at least a first filter member that is movable between a filter position and a removed position, and wherein the first drainage compartment includes at least a first drain that communicates the first drainage compartment with an exterior of the sludge dewatering tank,
   a first cover member that is pivotable between an open position and a closed position, wherein in the closed position the first cover member at least partially defines the first drainage compartment and covers an upper surface of the first filter member, wherein when the first cover member is in the open position the first filter member can be moved to the removed position,
   a second interior wall that cooperates with the second wall to define a second drainage compartment, wherein the second interior wall includes at least a second filter member that is movable between a filter position and a removed position, and wherein the second drainage compartment includes at least a second drain that communicates the second drainage compartment with the exterior of the sludge dewatering tank, a second cover member that is pivotable between an open position and a closed position, wherein in the closed position the second cover member at least partially defines the second drainage compartment and covers an upper surface of the second filter member, wherein when the second cover member is in the open position the second filter member can be moved to the removed position, wherein the first interior wall cooperates with the second interior wall to define a sludge space therebetween, and wherein the first drainage compartment includes at least a third drain that communicates the first drainage compartment with the exterior of the sludge dewatering tank, wherein the first and third drawings are position at opposite ends of the first drainage compartment, wherein the second drainage compartment includes at least a fourth drain that communicates the second drainage compartment with an exterior of the sludge dewatering tank, and wherein the second and fourth drains are position at opposite ends of the first drainage compartment.

3. The sludge dewatering tank of claim 2 wherein the first filter member includes a first screen coupled thereto, wherein the first filter member is capable of filtering particles down to a first particle size, wherein the first screen is capable of filtering particles down to a second particle size, wherein the second particle size is smaller than the first particle size.

\* \* \* \* \*